Oct. 16, 1928.

P. E. PULVERMAN 1,687,889

MEANS FOR SECURING INDICATOR FACINGS TO INDICATOR BODIES

Filed July 31, 1926

PHILIP E. PULVERMAN

INVENTOR.

BY
ATTORNEY

Patented Oct. 16, 1928.

1,687,889

UNITED STATES PATENT OFFICE.

PHILIP E. PULVERMAN, OF NEW YORK, N. Y.

MEANS FOR SECURING INDICATOR FACINGS TO INDICATOR BODIES.

Application filed July 31, 1926. Serial No. 126,267.

This invention relates to visible fluid pressure gauges, such as are used to measure air pressures in containers such as automobile tires, and, for convenience, reference is made to my Patent No. 1,629,887, as indicative of a general form of device to which the present invention is applicable.

Among the objects of this invention is the provision of an improved means of and method for securing the indicator or facing, variously referred to as the card or dial, to the plunger of the gauge. The invention consists generally in providing the plunger which has a longitudinal keyway with a longitudinal slit on either side of, close to and parallel with said keyway so as to provide a channel into which may be inserted the opposed edges of the indicator facing and which channel or slit may be closed or constricted by pressing over against the edge of the facing the flange or fin forming one of the walls of said slit, thereby securing the card or dial in place upon the plunger.

The invention contemplates also an improvement in the plunger for maintaining the integrity of the seal to prevent leakage of air between the top of the plunger and the sealing cap—the improvement being effected by gradually lessening the depth of the keyway as it approaches the top of the plunger so that the depth of the keyway at the rim shall be less than the depth throughout its major portion, so that when the cap is mounted on the plunger the entire width of the rim of the plunger shall come in contact with said cap.

The accompanying drawings illustrate a preferred embodiment of my invention, but the features of the invention may be applied to any other form of pressure gauge plunger without departing from the principles of my invention.

Throughout the drawings like reference numerals indicate like parts.

Figure 1:
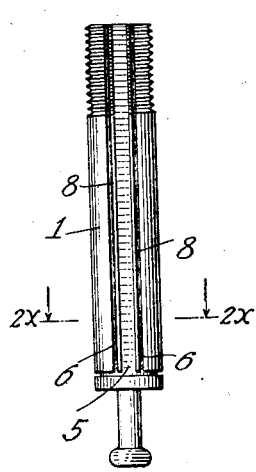
Fig. 1 is an elevation of a tire gauge plunger, the indicator facing being omitted.
Figure 3:
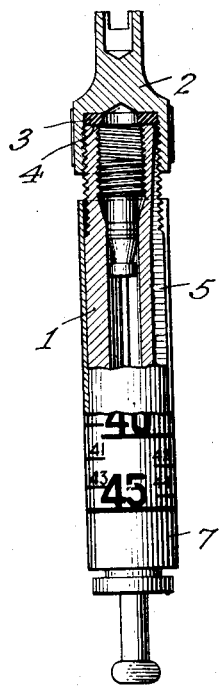
Fig. 3 is a longitudinal cross-section through Fig. 1 showing the tapering off of the keyway at its upper end.
Figure 2:
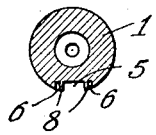
Fig. 2 is a cross-section on the line 2˟—2˟ of Fig. 1.
Figure 4:
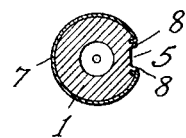
Fig. 4 is a cross-section of a plunger showing the indicator facing secured in place.

The element 1 referred to herein as the plunger it will be understood is the part of an automatic pressure indicator such as described and shown in my copending application Serial No. 608,823, filed December 26, 1922, which is mounted in and moves vertically within a stationary sleeve, this adjustment being provided for the purpose of indicating the pressure of air in a tire or other container which has been introduced through the valve.

The plunger consists of a metal cylinder 1 threaded at its upper end to receive a sealing cap 2 which is provided with a rubber washer 3 seating upon the rim 4 of the plunger to form a tight closure therewith. It is also provided with a keyway 5 to accommodate a key in the valve stem which prevents the plunger from rotating therein. The keyway tapers off to substantially zero depth at the top or rim 4 of the plunger, the object in thus tapering the keyway being to maintain the continuity of the seal between the rim and the cap. In practice I have found that when the keyway is cut through the rim of the plunger its full depth, the area of the seat against which the cap 2 engages is so reduced that it is difficult to keep the air from escaping at this point, if the valve proper has a tendency to leak.

In a device of this character it is preferable to provide the numerals by which the air pressure is shown on a card which is separate from the plunger as the indices may be printed or embossed on a flat sheet of suitable material such as celluloid which may subsequently be shaped into a cylindrical form and secured to the exterior of the plunger. As a convenient means of securing the indicator card to the plunger, I provide at each side and quite close to the keyway a longitudinal slit or channel 6 into which there are inserted the opposed inturned edges of the flexible indicator facing 7. The facing is preferably made of celluloid or similar material which may be formed into a cylinder and have its edges turned inwardly and given a permanent set so that when it is slipped over the plunger it will grip the latter and said edges will lie in the slots 6. As a further means of securing the facing the thin fins 8, 8, standing between the keyway and the grooves may be forced laterally by moving a spreader along the keyway.

Having described my invention, what I claim is:

1. In an instrument of the character described, a body member having a pair of channels into which the opposed edges of an indicator facing are adapted to be inserted, one wall of each channel being adapted to be pressed against the edge inserted in said channel to secure the edge therein.

2. The method of securing an indicator facing on a cylindrical supporting body having a longitudinal keyway consisting in providing longitudinal channels parallel with and close to said keyway, surrounding said body with the indicator facing and inserting its edges in said channels, and constricting said channels by pressing one of the walls of each of the channels against the inserted edges of the facing.

This specification signed this 28th day of July, 1926.

PHILIP E. PULVERMAN.